(12) United States Patent
Suzuki (10) Patent No.: US 10,234,997 B2
(45) Date of Patent: Mar. 19, 2019

(54) TOUCH SENSOR

(71) Applicant: LG DISPLAY CO., LTD., Seoul (KR)

(72) Inventor: Takayuki Suzuki, Tokyo (JP)

(73) Assignee: LG DISPLAY CO., LTD., Seoul (KR)

( * ) Notice: Subject to any disclaimer, the term of this patent is extended or adjusted under 35 U.S.C. 154(b) by 95 days.

(21) Appl. No.: 14/815,099

(22) Filed: Jul. 31, 2015

(65) Prior Publication Data

US 2016/0034079 A1  Feb. 4, 2016

(30) Foreign Application Priority Data

Aug. 1, 2014 (JP) ................. 2014-157820

(51) Int. Cl.
*G06F 3/044* (2006.01)
*G06F 3/047* (2006.01)

(52) U.S. Cl.
CPC .............. *G06F 3/044* (2013.01); *G06F 3/047* (2013.01)

(58) Field of Classification Search
CPC ........................................... G06F 3/041–3/047
See application file for complete search history.

(56) References Cited

U.S. PATENT DOCUMENTS

| 8,680,877 | B2 * | 3/2014 | Lee ......................... G06F 3/044 324/658 |
| 2010/0079393 | A1 * | 4/2010 | Dews ...................... G06F 3/044 345/173 |
| 2012/0113046 | A1 | 5/2012 | Akira |
| 2014/0043252 | A1 | 2/2014 | Kim et al. |
| 2014/0160377 | A1 | 6/2014 | Yamagishi et al. |
| 2016/0266675 | A1 * | 9/2016 | Yang ...................... G06F 3/0412 |

FOREIGN PATENT DOCUMENTS

| CN | 102227705 A | 10/2011 |
| CN | 103870050 A | 6/2014 |
| JP | 2006-201084 A | 8/2006 |
| JP | 2010-75347 A | 4/2010 |
| JP | 2012-504819 A | 2/2012 |
| KR | 10-1134354 B1 | 4/2012 |
| KR | 10-2012-0049019 A | 5/2012 |
| KR | 10-2014-0021255 A | 2/2014 |
| KR | 10-2014-0074453 A | 6/2014 |

OTHER PUBLICATIONS

Plus Plus Geometric Modern Pattern, Little Smilemakers Studio, Jan. 16, 2014, https://web-beta.archive.org/web/20140116144715/https://www.spoonflower.com/profiles/littlesmilemakers.*

* cited by examiner

*Primary Examiner* — Gene W Lee
(74) *Attorney, Agent, or Firm* — Birch, Stewart, Kolasch & Birch, LLP (57) ABSTRACT

Discussed is a touch sensor for use in an in-cell type touch sensor panel that includes a plurality of sensor elements, wherein each sensor element has a shape such that a maximum diameter of a circle able to be inscribed in the sensor element is smaller than a diameter of a circle inscribed in a square having the same area as the sensor element.

5 Claims, 6 Drawing Sheets

| panel size [inch] | sensor area [mm$^2$] | multiple-sensor redundancy rate [%] | |
|---|---|---|---|
| | | cross | square |
| 4.5 | 7.4 | 100.0 | 100.0 |
| 5.5 | 9.0 | 100.0 | 100.0 |
| 6.0 | 10.0 | 100.0 | 84.6 |
| 7.0 | 11.6 | 97.5 | 63.4 |
| 8.0 | 13.4 | 79.6 | 49.3 |

FIG. 5

| panel size [inch] | sensor area [mm²] | touch precision average error [mm] | | | |
|---|---|---|---|---|---|
| | | center | | edge | |
| | | cross | square | cross | square |
| 4.5 | 7.4 | 0.09 | 0.23 | 0.30 | 0.49 |
| 5.5 | 9.0 | 0.39 | 0.61 | 0.55 | 0.86 |
| 6.0 | 10.0 | 0.58 | 0.80 | 0.71 | 1.05 |
| 7.0 | 11.6 | 0.95 | 1.21 | 1.05 | 1.45 |
| 8.0 | 13.4 | 1.36 | 1.64 | 1.42 | 1.87 |

TOUCH SENSOR

The present application claims the priority benefit of Japanese Patent Application No. 2014-157820 filed in Japan on Aug. 1, 2014, which is hereby incorporated by reference in its entirety for all purposes as if fully set forth herein.

BACKGROUND OF THE INVENTION

Field of the Invention

The present invention relates to a touch sensor for use in an in-cell type touch sensor panel.

Discussion of the Background Art

Recently, smart phones and tablets proceed to have thin profile, and capacitive touch panels proceed in such a way that a touch sensor is installed in a liquid crystal display (LCD) (referring to, for example, the below Japanese publication).

Figure 8:
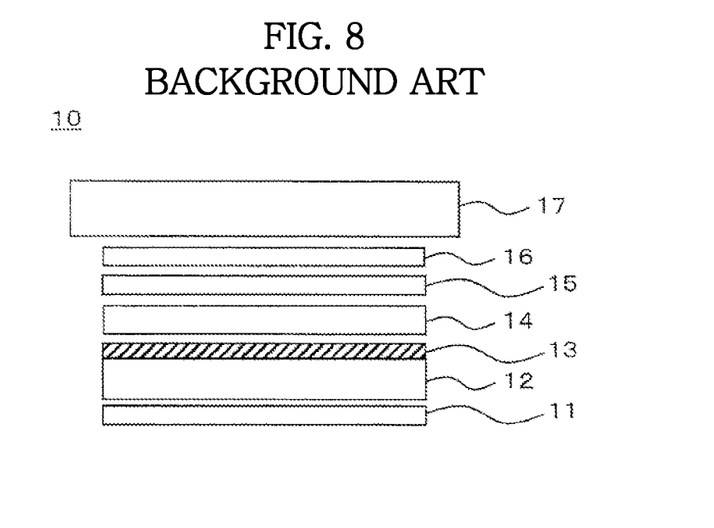
FIG. 8 is a cross-sectional view illustrating a touch sensor-embedded display device having an in-cell touch panel according to the background art.

FIG. 8 is a cross-sectional view illustrating a touch sensor-embedded display device having an in-cell touch panel according to the background art.

Referring to FIG. 8, the display device 10 includes a first polarizing plate 11, a TFT (thin film transistor) glass substrate 12, a common electrode 13, a color filter glass substrate 14, a second polarizing plate 15, an adhesive 16, and a cover glass 17 which are stacked up in layers.

The in-cell type touch panel uses the common electrode 13 for operating liquid crystal as a touch sensor. In other words, when an LCD is operated, a sensing touch voltage is applied to the common electrode 13. Further, even though not shown in the drawings, liquid crystal is injected between the TFT glass substrate 12 and the common electrode 13. Further, a color filter and an alignment film are not shown.

Figure 9:
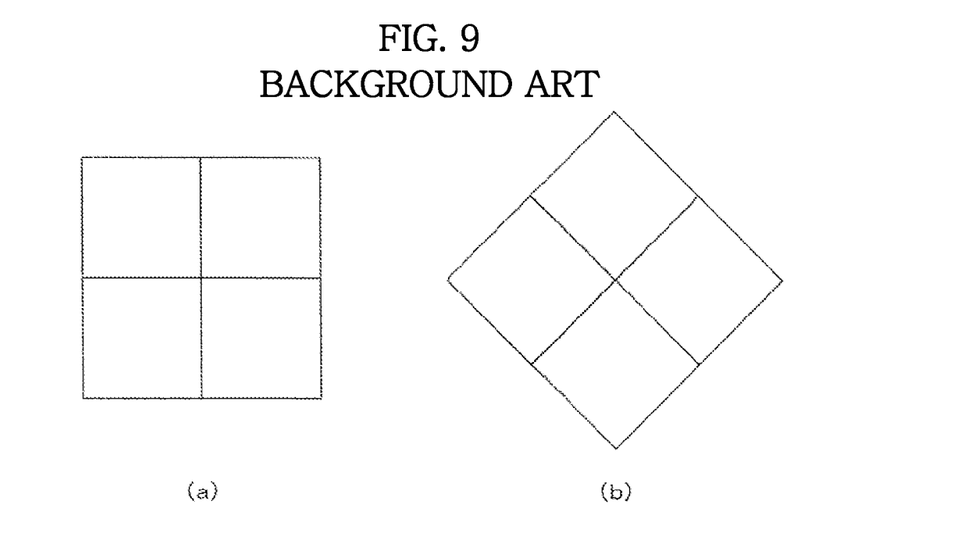
FIG. 9 is a view illustrating a shape of a touch sensor applied to an in-cell type touch panel according to the background art.

FIG. 9 is a view illustrating a shape of a touch sensor applied to an in-cell type touch panel according to the background art. FIG. 9(a) shows a touch sensor having a square shape, and FIG. 9(b) shows a touch sensor having a diamond shape. The shapes shown in FIGS. 9(a) and 9(b) are common ones in products in the market.

Japanese Patent Application Publication No. 2006-201084 discusses an LCD having a touch sensor according to the background art.

However, in the background art, there are following problems.

When the square-shaped touch sensor or the diamond-shaped touch sensor applied to the background art in-cell touch panel is touched using a thing having a small contact area for a touch sensor, for example, a touch pen or the like, a contact region does not extend over a plurality of sensor elements but falls within a range of one sensor element.

In the case that the contact region falls within a range of one sensor element, even tough touch positions vary in the sensor element, touch coordinates each indicating a center of a contact region of a touch position are uniformly expressed as a center of the sensor element unlike centers of real touch positions. Accordingly, it is problematic that a touch performance is remarkably degraded.

In other words, a touch coordinate is calculated using a following formula (1) by a center calculation from a relationship of an output value of each sensor element and a center coordinate of each sensor element. Further, in the formula (1), Di indicates an output value of each sensor element, Xi indicates a X coordinate (in a X axis direction) of a center of each sensor element, and Yi indicates a Y coordinate (in a Y axis direction) of a center of each sensor element.

Formula (1)

$$\left. \begin{array}{l} Dsum = \sum_{i=1}^{n} Di \\ Xsum = \sum_{i=1}^{n} Di \times Xi \\ Ysum = \sum_{i=1}^{n} Di \times Yi \end{array} \right\} \Rightarrow \begin{array}{l} X\ center = Ysum/Dsum \\ Y\ center = Ysum/Dsum \end{array} \quad (1)$$

Figure 10:
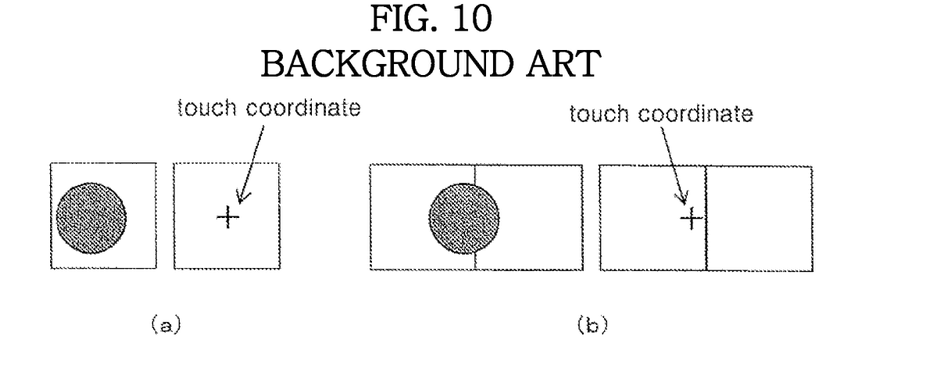
FIG. 10 is a view illustrating a relationship between a contact region and a sensor element, and a touch coordinate in this relationship in a case that a contact area for a touch sensor is smaller than a sensor area of each sensor element according to the background art.

FIG. 10 is a view illustrating a relationship between a contact region and a sensor element, and a touch coordinate in this relationship in a case that a contact area for a touch sensor is smaller than a sensor area of each sensor element. FIG. 10(a) shows a case that a contact region falls within a range of one sensor element, and FIG. 10(b) shows a case that a contact region extends over two sensor elements.

It is assumed that a touch coordinate in a vertical direction is on a center line of a vertical direction of each sensor element. Further, it is assumed that a touch sensor is a square-shaped one with each side of 6.4 mm, and a contact region is circular with a diameter of 4.0 mm.

In FIG. 10(a), in a case that a contact region falls within a range of one sensor element, an output value from other sensor element is 0, and thus a touch coordinate by the formula (1) is uniformly expressed as a center of a sensor element regardless of a touch position within a sensor element. Accordingly, a correct touch coordinate cannot be calculated.

In FIG. 10(b), in a case that a contact region extends over two sensor elements, based on output values from the two sensor elements, a touch coordinate can be calculated by the formula (1) according to a ratio of the output values from the two sensor elements. As such, when a contact region extends over a plurality of sensor elements, a correct touch coordinate cannot be calculated.

Further, in FIGS. 10(a) and 10(b), a touch coordinate in a vertical direction is on a center line of a vertical direction of each sensor element. However, in a state that a contact region falls within a range of one sensor element, even when a touch coordinate in a vertical direction deviates from a center line of a vertical direction of each sensor element, a correct touch coordinate in a vertical direction can't be calculated.

Figure 11:
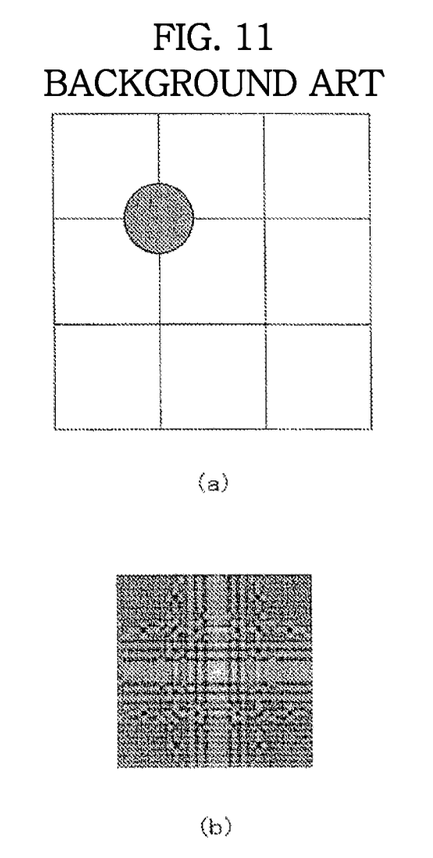
FIG. 11 a view illustrating a simulation result when a touch position moves at a certain speed in a case that a contact area for a touch sensor is smaller than a sensor area of each sensor element according to the background art.

FIG. 11 a view illustrating a simulation result when a touch position moves at a certain speed in a case that a contact area for a touch sensor is smaller than a sensor area of each sensor element. FIG. 11(a) shows a position relationship of a contact region and each sensor element, and FIG. 11(b) shows a result of plotting calculated touch coordinates for one sensor element.

Concretely, touch coordinates are calculated by the formula (1) while a touch position moving by a certain amount in a horizontal direction and a vertical direction from a left upper side to a right lower side with respect to a sensor element in the center, and the calculated touch coordinates are plotted as shown in FIG. 11(b). Further, in FIG. 11(b), as a plotted number increases, a corresponding color becomes white.

From FIGS. 11(a) and 11(b), in a case that a contact region extends over a center sensor element and other sensor element surrounding the center sensor element, a correct touch coordinate can be calculated, as explained above, and in a case that a contact region falls within one sensor element, a touch coordinate is uniformly expressed as a center of a sensor element, and thus a correct touch coordinate cannot be calculated and a number plotted at a center of a sensor element increases.

In other words, in FIG. 11(b), touch coordinates should be evenly plotted, and in a case that a contact region falls within a range of one sensor element, a touch coordinate is plotted at a center of a sensor element. Thus there happens an error between a calculated touch coordinate and a real touch coordinate, and looseness and denseness appear. Accordingly, a touch performance is remarkably degraded.

Further, it could be considered that by reducing a sensor area of each sensor element to increase a number of sensor elements, a contact region extends over a plurality of sensor elements. However, since an in-cell touch panel uses a common electrode as a touch sensor, as explained above, it is difficult to form a sensor element having a complicated shape.

SUMMARY OF THE INVENTION

Accordingly, the present invention is directed to a touch sensor applied to an in-cell type touch panel that can improve a touch performance with a number of sensors and a sensor area as a touch sensor associated with the background art even when a touch is conducted using a thing having a small contact area for a touch sensor.

Additional features and advantages of the disclosure will be set forth in the description which follows, and in part will be apparent from the description, or may be learned by practice of the disclosure. The advantages of the disclosure will be realized and attained by the structure particularly pointed out in the written description and claims as well as the appended drawings.

To achieve these and other advantages, and in accordance with the purpose of the present invention, as embodied and broadly described herein, a touch sensor for use in an in-cell type touch sensor panel includes a plurality of sensor elements, wherein each sensor element has such a shape that a maximum diameter of a circle able to be inscribed in the sensor element is smaller than a diameter of a circle inscribed in a square having the same area as the sensor element.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION OF THE ILLUSTRATED EMBODIMENTS

Reference will now be made in detail to embodiments, examples of which are illustrated in the accompanying drawings. The same or like reference numbers may be used throughout the drawings to refer to the same or like parts. Further, even though a touch sensor according to the embodiments of the present invention is applied to an in-cell type touch panel, the configuration of a touch sensor-embedded display device having an in-cell touch panel (excluding the touch sensor's configuration) may be substantially the same as that shown in FIG. 8 and explanations thereof may be omitted.

Embodiment

Figure 1:
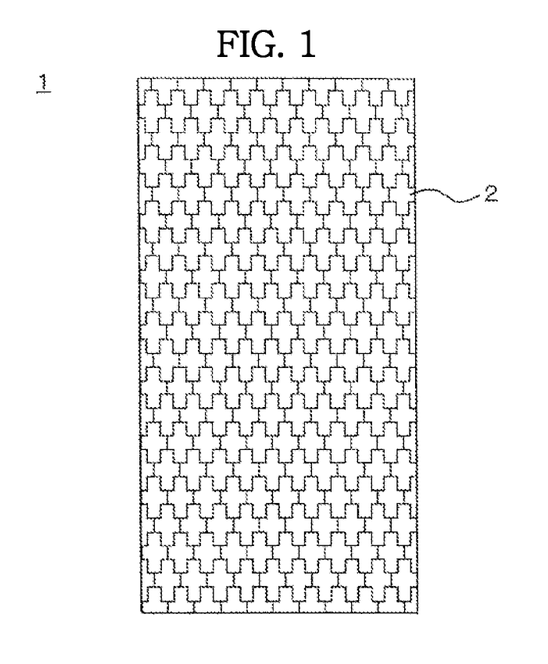
FIG. 1 is a view illustrating a configuration of a touch sensor according to an embodiment of the present invention.

FIG. 1 is a view illustrating a configuration of a touch sensor 1 according to an embodiment of the present invention. FIGS. 2(a) and 2(b) are views enlarging an edge portion and a corner portion, respectively, of a touch sensor of FIG. 1 according to an embodiment of the invention.

Figure 2:
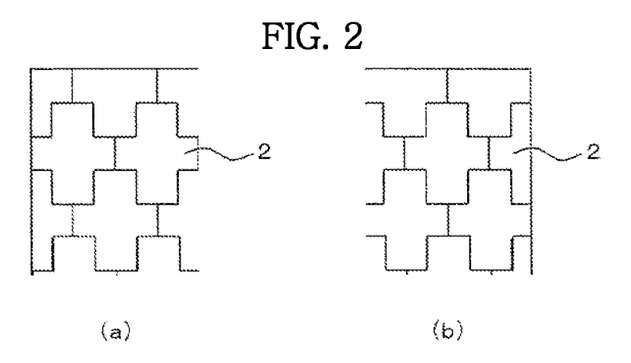
FIG. 2, including (a) and (b), shows views enlarging an edge portion and a corner portion, respectively, of the touch sensor of FIG. 1.

In FIGS. 1 and 2, the touch sensor 1 is configured by arranging sensor elements 2 having a cross shape. Regarding each sensor element 2, the sensor element 2 has such a shape that a maximum diameter of a circle able to be inscribed in a sensor element 2 appears to become smaller than a diameter of a circle inscribed in a square having the same area as the sensor element 2.

Further, the edge portion and the corner portion of each sensor element 2 are configured by arranging having a "L" shape and/or a convex shape. Accordingly, even at the edge portion and the corner portion, the sensor elements 2 can be arranged without gaps.

Figure 3:
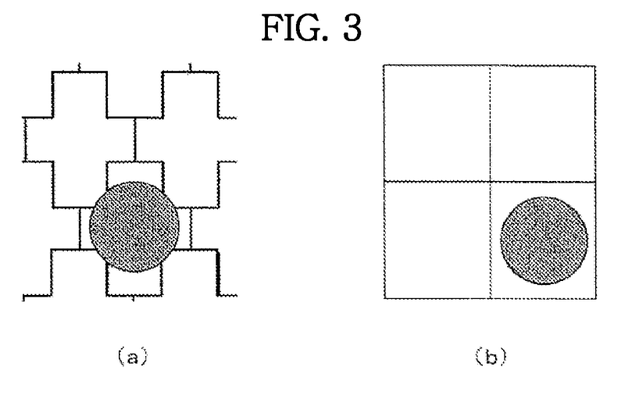
FIG. 3 is a view comparing a relationship between a contact region and a sensor element using the touch sensor of FIG. 1 with a relationship between a contact region and a sensor element using a touch sensor of the background art.

FIG. 3 is a view comparing a relationship between a contact region and a sensor element using the touch sensor of FIG. 1 according to the invention, with a relationship between a contact region and a sensor element using a touch sensor of the background art. FIG. 3(a) shows a relationship between a contact region and a cross-shaped sensor element of the present invention, and FIG. 3(b) shows a relationship between a contact region and a square-shaped sensor element of the background art. It is assumed that contact regions of FIGS. 3(a) and 3(b) have the same size, and the cross-shaped sensor element and the square-shaped sensor element have the same sensor area.

In a case that a contact area for a touch sensor is smaller than a sensor area of each sensor element, it is seen from FIGS. 3(a) and 3(b) that the cross-shaped sensor element of the present invention has a higher probability of a contact region extending over a plurality of sensor elements than the square-shaped sensor element of the background art. Accordingly, a correct touch coordinate can be calculated.

As such, by using the cross-shaped sensor element of the present invention, even in a case that a contact area for a touch sensor is smaller than a sensor area of each sensor element, a probability that a contact region falls within a range of only one sensor element and a touch coordinate indicating a center of a contact region at a touch position is uniformly expressed as a center of a sensor element is reduced, and a touch performance can be improved.

Figure 4:
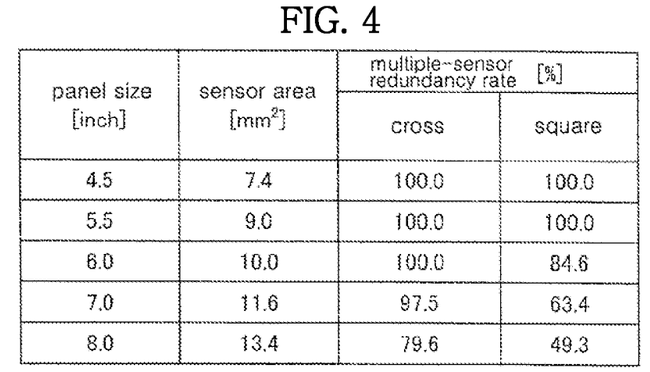
FIG. 4 is a view comparing a multiple-sensor redundancy rate using the touch sensor of FIG. 1 with a multiple-sensor redundancy rate using the touch sensor of the background art.

FIG. 4 is a view comparing a multiple-sensor redundancy rate using the touch sensor (a cross-shaped touch sensor) in FIG. 1 according to the present invention with a multiple-sensor redundancy rate using the touch sensor (a square-shaped touch sensor) in the background art. The multiple-sensor redundancy rate is defined as a probability that a contact region extends over multiple sensors when a touch is conducted moving an entire of a touch sensor little by little.

FIG. 4 shows a sensor area per one sensor element and a multiple-sensor redundancy rate when a panel size of a touch panel varies from 4.5 inches to 8.0 inches in a case that a number of sensor elements is fixed to 12*20 and a contact region has a circle with a diameter of 5.0 mm.

In the case of using the touch sensor of FIG. 1 ("cross") of the present invention, even though the touch sensor has the same number of sensor elements and the same sensor area as the background art touch sensor ("square"), it is seen from FIG. 4 that a multiple-sensor redundancy rate rises. In other words, by just changing a shape of the sensor element, a probability that a contact region extends over multiple sensor elements rises, and a touch performance can be improved. Further, even when a panel size increases, the touch precision can be secured.

Figure 5:
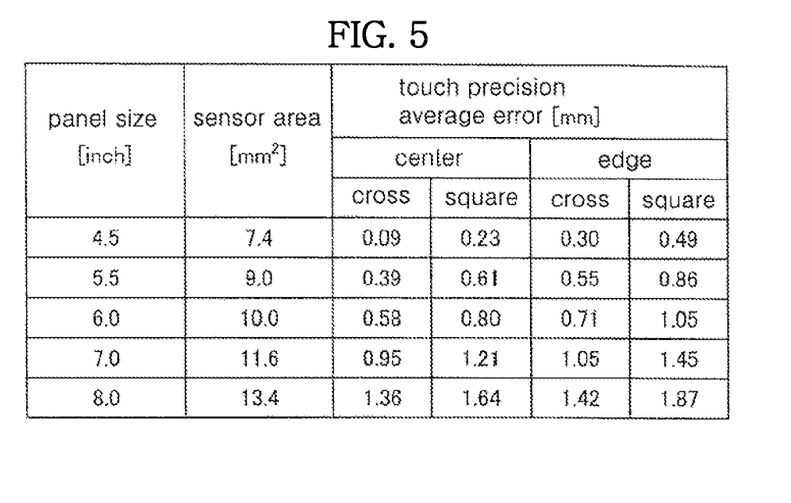
FIG. 5 is a view comparing an average error between a calculated touch coordinate and a real touch coordinate using the touch sensor of FIG. 1 with an average error between a calculated touch coordinate and a real touch coordinate using the touch sensor of the background art.
Figure 6:
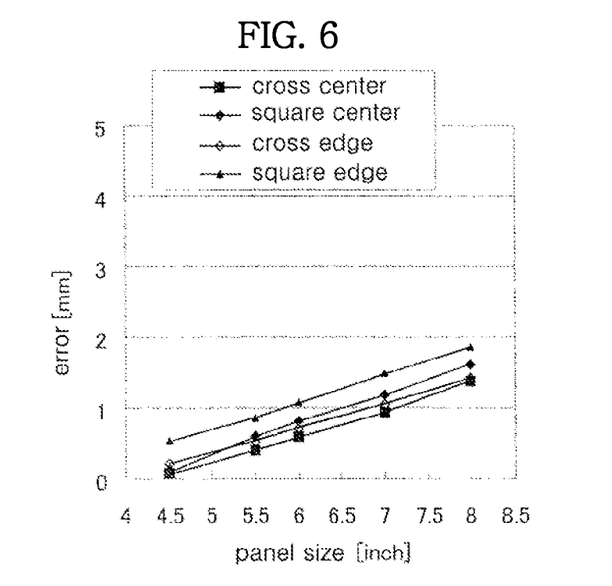
FIG. 6 is a view illustrating graphs of average errors in FIG. 5.

FIG. 5 is a view comparing an average error between a calculated touch coordinate and a real touch coordinate using the touch sensor (a cross-shaped touch sensor or "cross") of FIG. 1 according to the present invention, with an average error between a calculated touch coordinate and a real touch coordinate using the touch sensor (a square-shaped touch sensor or "square") of the background art. FIG. 6 is a view illustrating graphs of average errors in FIG. 5.

FIG. 5 shows a sensor area per one sensor element and an average error when the panel size of a touch panel varies from 4.5 inches to 8.0 inches in a case that the number of sensor elements is fixed to 12*20 and a contact region has a circle with a diameter of 5.0 mm. In FIG. 5, an error at an edge portion increases because a number of sensor elements that a contact region extends over is reduced at the edge portion.

In the case of using the touch sensor of FIG. 1 according to the present invention, even though the touch sensor has the same number of sensor elements and the same sensor area as the background art touch sensor, it is seen from FIG. 5 that an average error between a calculated touch coordinate and a real touch coordinate is reduced. In other words, by just changing the shape of a sensor element, an average error of a touch coordinate is reduced, and a touch performance can be improved. Further, even when the panel size increases, a touch precision can be secured.

As described above, according to the embodiments of the present invention, each of sensor elements constituting a touch sensor has a shape such that a maximum diameter of a circle able to be inscribed in a sensor element appears to become smaller than a diameter of a circle inscribed in a square having the same area as the sensor element.

Therefore, even in a case that a touch is conducted using a thing having a small contact area for a touch sensor, a touch sensor, applied to an in-cell type touch panel, that can improve a touch performance with the same sensor number and sensor area as the background art touch sensor can be obtained.

Further, in the above embodiments, it is described that the sensor element has a cross shape, but it is not limited. For example, if a shape of a sensor element is such that a maximum diameter of a circle able to be inscribed in a sensor element appears to become smaller than a diameter of a circle inscribed in a square having the same area as the sensor element, any one of shapes as shown in FIGS. 7(a) to 7(d) is available and can be used as the shape of the sensor elements according to the present invention. For example, the sensor element may has a shape that has at least five sides.

Figure 7:
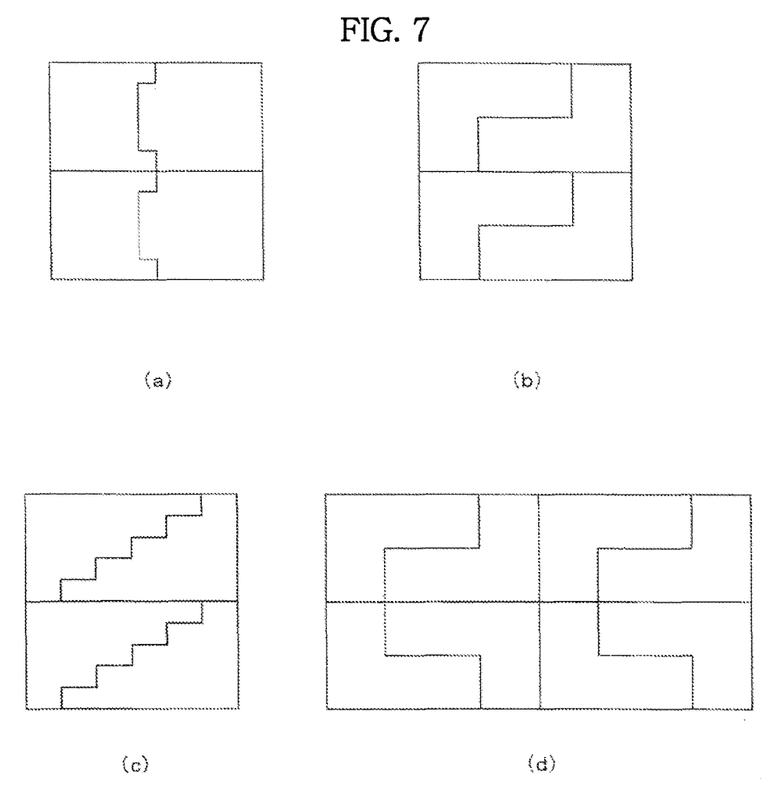
FIG. 7 is a view illustrating examples of a shape of a sensor element of a touch sensor according to an embodiment of the present invention.

FIG. 7 is a view illustrating various examples of a shape of a sensor element of a touch sensor according to an embodiment of the present invention. FIG. 7(a) shows that in a case that two sensor elements are paired, a border portion between the paired sensor elements has a concavo-convex shape, and FIGS. 7(b) to 7(d) show that in a case that two sensor elements are paired, a border portion between the paired sensor elements has a step shape.

It will be apparent to those skilled in the art that various modifications and variations can be made in a display device of the present invention without departing from the sprit or scope of the disclosure. Thus, it is intended that the present invention covers the modifications and variations of this disclosure provided they come within the scope of the appended claims and their equivalents.

What is claimed is:

1. A touch sensor for use in a touch sensor panel, comprising:
   a plurality of sensor elements including at least three different shapes including a cross shaped sensor element, a six-sided L shaped sensor element and an eight-sided convex shaped sensor element,
   wherein a majority of the plurality of sensor elements is the cross shaped sensor element that has a maximum diameter of a circle able to be inscribed in the corresponding cross shaped sensor element is smaller than a diameter of a circle inscribed in a square having a same area as the corresponding cross shaped sensor element,
   wherein each cross shaped sensor element among the majority that is disposed in a center portion of the touch sensor is enclosed by exactly six directly adjacent cross shaped sensor elements,
   wherein a ratio of an area (b) of each cross shaped sensor element among the majority to a panel size (a) of the touch sensor panel is, b/a=about 1.65~1.68 mm$^2$ per inch of a dimension of the panel size of the touch sensor,
   wherein an edge portion of the touch sensor or a corner portion of the touch sensor includes the six-sided L shaped sensor element adjacent to the eight-sided convex shaped sensor element, and at least a portion of one of the cross shaped sensor elements among the majority is disposed between corresponding portions of the six-sided L shaped sensor element and the eight-sided convex shaped sensor element, wherein at least one corner of the touch sensor panel includes the six-sided L shaped sensor element and at least one corner of the touch sensor panel includes the eight-sided convex shaped sensor element, and wherein at least one six-sided L shaped sensor element is disposed directly adjacent to at least one eight-sided convex shaped sensor element without a cross shaped sensor element therebetween.

2. The touch sensor of claim 1, wherein the touch sensor panel is an in-cell type touch sensor panel in which the touch sensor is embedded.

3. A touch sensor for use in a touch sensor panel, comprising:
- a plurality of sensor elements including at least three different shapes including a cross shaped sensor element, a six-sided L shaped sensor element and an eight-sided convex shaped sensor element,
- wherein a majority of the plurality of sensor elements is the cross shaped sensor element,
- wherein each cross shaped sensor element among the majority disposed in a center portion of the touch sensor is enclosed by exactly six directly adjacent cross shaped sensor elements,
- wherein a ratio of an area (b) of each cross shaped sensor element among the majority to a panel size (a) of the touch sensor panel is, b/a=about 1.65~1.68 mm$^2$ per inch of a dimension of the panel size of the touch sensor,
- wherein an edge portion of the touch sensor or a corner portion of the touch sensor includes the six-sided L shaped sensor element adjacent to the eight-sided convex shaped sensor element, and at least a portion of one of the cross shaped sensor elements among the majority is disposed between corresponding portions of the six-sided L shaped sensor element and the eight-sided convex shaped sensor element,
- wherein at least one corner of the touch sensor panel includes the six-sided L shaped sensor element and at least one corner of the touch sensor panel includes the eight-sided convex shaped sensor element, and
- wherein at least one six-sided L shaped sensor element is disposed directly adjacent to at least one eight-sided convex shaped sensor element without a cross shaped sensor element therebetween.

4. The touch sensor of claim 3, wherein the touch sensor is embedded in a display device having an in-cell touch panel.

5. A method for forming a touch sensor for use in a touch sensor panel, the method comprising:
- providing a plurality of sensor elements including at least three different shapes including a cross shaped sensor element, a six-sided L shaped sensor element and an eight-sided convex shaped sensor element, wherein a majority of the plurality of sensor elements is the cross shaped sensor element; and
- placing each cross shaped sensor element among the majority in a manner such that each cross shaped sensor element among the majority disposed in a center portion of the touch sensor is enclosed by exactly six directly adjacent cross shaped sensor elements,
- wherein a ratio of an area (b) of each cross shaped sensor element among the majority to a panel size (a) of the touch sensor panel is, b/a=about 1.65~1.68 mm$^2$ per inch of a dimension of the panel size of the touch sensor,
- wherein an edge portion of the touch sensor or a corner portion of the touch sensor includes the six-sided L shaped sensor element adjacent to the eight-sided convex shaped sensor element, and at least a portion of one of the cross shaped sensor elements among the majority is disposed between corresponding portions of the six-sided L shaped sensor element and the eight-sided convex shaped sensor element,
- wherein at least one corner of the touch sensor panel includes the six-sided L shaped sensor element and at least one corner of the touch sensor panel includes the eight-sided convex shaped sensor element, and
- wherein at least one six-sided L shaped sensor element is disposed directly adjacent to at least one eight-sided convex shaped sensor element without a cross shaped sensor element therebetween.

* * * * *